(12) United States Patent
Berger et al.

(10) Patent No.: US 9,669,663 B2
(45) Date of Patent: Jun. 6, 2017

(54) TIRE INCLUDING A TREAD PROVIDED WITH INCISIONS INCLUDING WIDE PORTIONS AND NARROW PORTIONS

(75) Inventors: Eric Berger, Clermont-Ferrand (FR); Julien Flament, Clermont-Ferrand (FR); Olivier Muhlhoff, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 540 days.

(21) Appl. No.: 14/232,581

(22) PCT Filed: Jul. 11, 2012

(86) PCT No.: PCT/EP2012/063568
§ 371 (c)(1),
(2), (4) Date: Feb. 18, 2014

(87) PCT Pub. No.: WO2013/007745
PCT Pub. Date: Jan. 17, 2013

(65) Prior Publication Data
US 2014/0166172 A1      Jun. 19, 2014

(30) Foreign Application Priority Data

Jul. 12, 2011 (FR) ...................................... 11 56357

(51) Int. Cl.
*B60C 11/00*     (2006.01)
*B60C 11/12*     (2006.01)
(Continued)

(52) U.S. Cl.
CPC ...... *B60C 11/1218* (2013.04); *B60C 11/0323* (2013.04); *B60C 11/04* (2013.01);
(Continued)

(58) Field of Classification Search
CPC ............ B60C 11/1218; B60C 11/0323; B60C 11/1281; B60C 11/1307; B60C 2011/1209; B60C 2011/1213
See application file for complete search history.

(56) References Cited

U.S. PATENT DOCUMENTS

| 5,603,366 A | 2/1997 | Nakayama |
| 2011/0120610 A1 | 5/2011 | Fugler |

FOREIGN PATENT DOCUMENTS

| FR | 2924981 | 6/2009 |
| JP | 3001910 | 1/1991 |
| JP | 7276923 | 10/1995 |

OTHER PUBLICATIONS

International Search Report (PCT/ISA/210) mailed on Aug. 31, 2012, by the European Patent Office as the International Searching Authority for International Application No. PCT/EP2012/063568.

*Primary Examiner* — Timothy Kennedy
(74) *Attorney, Agent, or Firm* — Dickinson Wright PLLC

(57) ABSTRACT

Tyre comprising a tread, this tread including a rolling surface (12) intended to come into contact with the ground, at least one circumferential row of upstanding elements (11), these upstanding elements (11) being separated from one another in the circumferential direction by incisions (20) of transverse or substantially transverse orientation, each incision (20) of transverse or substantially transverse orientation leading onto the rolling surface (12) and having a depth P, each incision (20) forming, on the rolling surface of the tyre when new, two facing edges (21, 22), these edges (21, 22) delimiting at least one narrow portion (30) of the incision, i.e. a portion having a mean width LE less than or equal to 2 mm, and at least one wide portion (40) of the incision, i.e. a portion having a mean width LL greater than 2 mm, these wide and narrow portions being disposed alternately, each narrow portion (30) and each wide portion (40) extending (Continued)

the full depth P of the incision (20), each narrow portion (30) having a volume uniformly distributed over the full depth P of the incision, each wide portion (40) having a volume for the most part between half the depth P of the cut-out and the depth P, this tread being characterized in that the following condition is satisfied:

$0.90 \times E/R < (\text{sum } LE)/Pr < 1.10 \times E/R$, in which:

(sum LE) is the sum of the mean widths LE of the narrow portions of all the incisions separating the upstanding elements of the same row on a circle centred on the rotation axis of the tyre, R is the mean radius of the circle centred on the rotation axis on the rolling surface of the row concerned when new and Pr is the mean perimeter of the circle centred on the rotation axis and passing through a circumferential series of incisions in accordance with the invention, E is the mean thickness of the tread at the level of the row concerned.

7 Claims, 3 Drawing Sheets

(51) Int. Cl.
*B60C 11/04* (2006.01)
*B60C 11/03* (2006.01)
*B60C 11/13* (2006.01)

(52) U.S. Cl.
CPC ...... *B60C 11/1281* (2013.04); *B60C 11/1307* (2013.04); *B60C 2011/1209* (2013.04); *B60C 2011/1213* (2013.04)

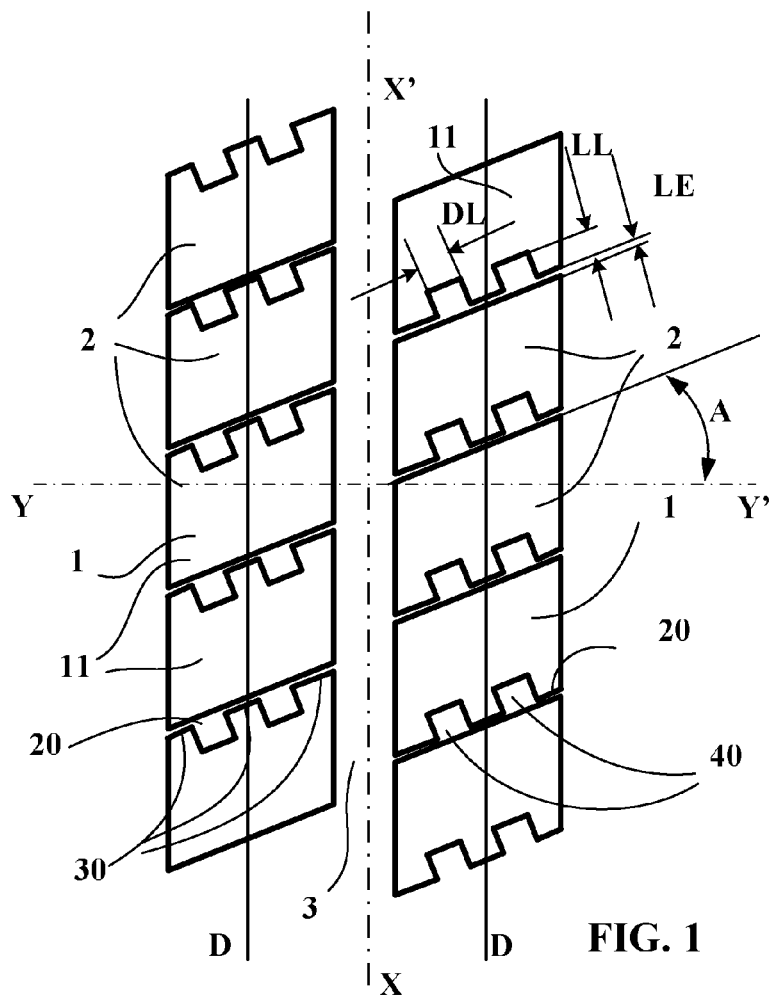
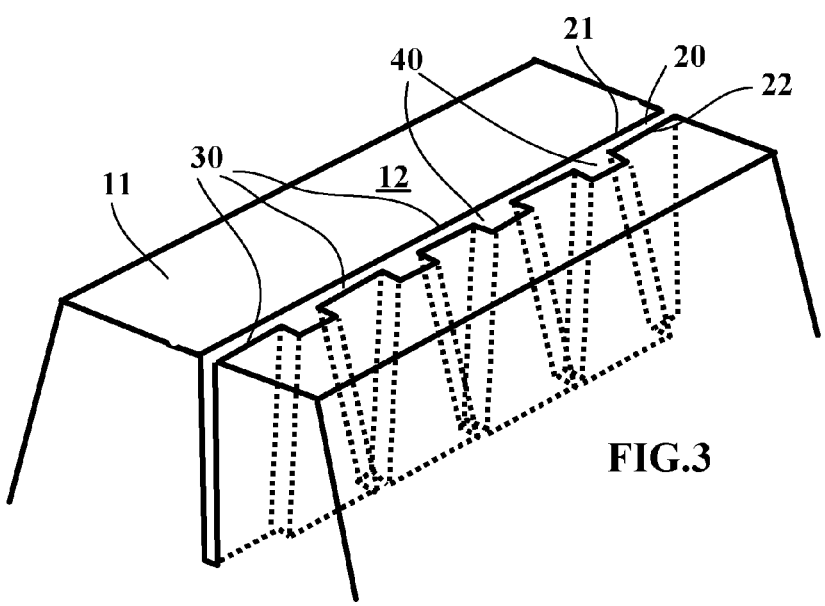

TIRE INCLUDING A TREAD PROVIDED WITH INCISIONS INCLUDING WIDE PORTIONS AND NARROW PORTIONS

This application is a 371 of PCT/EP2012/063568, filed 11 Jul. 2012, which claims benefit of FR1156357, filed 12 Jul. 2011, the entire contents of each of which is incorporated by reference herein for all purposes.

BACKGROUND

1. Field

Disclosed herein are treads for tires, in particular for tires intended to be used on snow-covered ground. Also disclosed are tires for touring vehicles equipped with such treads.

2. Description of Related Art

It is known to provide a tire tread with a sculpted design including a plurality of cut-outs of different sizes, notably with the aim of evacuating water present in rainy weather between the road surface and the tread. It is thus possible to ensure adhesion of the tire to said road surface that is satisfactory from a safety point of view. By "cut-out" is meant a hollow space of a tread delimited by walls of rubber mixture or any other material forming the tread, these walls facing each other and leading onto the tread, where they form facing edges.

According to the width of these cut-outs, a distinction is made between grooves (at least 2 mm wide) and incisions (less than 2 mm wide); thanks to this small width the latter offer the advantage of closing at least partially on coming into contact with the road surface, i.e. at least in part the facing walls delimiting these incisions are in contact one against the other. All the cut-outs form edges on the surface of the tread, this surface (called the "rolling surface") being in contact with the road surface; these edges are very important for improving rolling performance, notably on a snow-covered road surface or a wet road surface in rainy weather.

Winter tires rolling on a snow-covered road surface may exhibit the following disadvantage: the cuts forming the sculpted design fill with snow and retain this snow from one coming into contact to the next. If snow fills the cuts, it is no longer rubber-snow adhesion that determines the behaviour of the tire, but snow-snow adhesion. Obviously, snow will tend to fill narrow cuts faster.

To address this disadvantage, it has been proposed to provide each incision with areas widened relative to the width of this incision, in order to increase the storage capacity of the incision. The document EP 0847878 seeks to improve the traction of a tire for snow-covered ground and to this end proposes a tire tread including a cut-out leading onto the rolling surface and having a depth less than the thickness of the tread, this cut-out forming two facing edges on the rolling surface of the tire when new, these edges delimiting a plurality of narrow portions and at least one wide portion, these wide and narrow portions being disposed alternately and extending the full depth of the cut-out. The wide portions have a width decreasing progressively toward the interior of the tread.

The document EP 1190871 describes a solution making it possible to ensure non-closure of a cut-out when the tire is subjected to acceleration or braking. This solution consists in locally reducing the width of each incision by forming a sort of protuberances. The document describes a tread including at least one cut-out leading onto the rolling surface and having a depth less than the thickness of the tread, this cut-out forming two facing edges on the rolling surface of the tire, these edges delimiting a plurality of narrow portions and a plurality of wide portions, the wide and narrow portions being disposed alternately, the narrow portions extending the full depth of the cut-out, the wide portions extending into the depth of the tread to at least 30% of the depth of the cut-outs. Wide portions are formed between the protuberances and narrow portions are formed at the location of the protuberances.

The sculptural designs proposed in the cited references have a number of drawbacks. In particular, the structure of the bottom of the cut-out entails the risk of cracks arising and thereby compromising the durability of the tire.

The document JP-7276923 describes a tread comprising blocks provided with incisions comprising narrow parts and wide parts disposed alternately.

DEFINITIONS

A block is an upstanding element formed on the tread that is delimited by recesses or grooves and comprises lateral walls and a contact face intended to come into contact with the road surface.

By radial direction there is meant in the present document a direction that is perpendicular to the rotation axis of the tire (this direction corresponds to the direction of the thickness of the tread).

By axial direction is meant a direction parallel to the rotation axis of the tire.

By circumferential or longitudinal direction is meant a direction that is perpendicular both to the axial direction and to a radial direction.

SUMMARY

An embodiment of the invention relates to a tread for tires intended to be used in winter conditions and offering good adhesion of the tire to snow as well as limiting energy losses whatever the rolling conditions.

This objective is achieved by a tire tread having a thickness E corresponding to the thickness of material that may be worn away by rolling before having to change the tire or at least recondition it. This tread includes:
- a rolling surface intended to come into contact with the road surface when the tire rolls on a road surface, this surface being formed by all the contact faces of the sculptural elements;
- at least one incision of varying width oriented transversely or substantially transversely, leading onto the rolling surface and having a depth P.

This depth P is preferably at most equal to the thickness E of the tread.

This transverse or substantially transverse incision has a varying width and forms on the rolling surface of the tread when new two facing edges delimiting at least one narrow incision portion, i.e. a portion having a mean width LE less than or equal to 2 mm, and at least one wide incision portion, i.e. a portion having a mean width LL greater than 2 mm. The widths of the wide and narrow portions are measured perpendicularly to the walls delimiting the incision.

These wide and narrow incision portions are disposed alternately, each narrow portion extending the full depth P of the incision and each wide portion extending the full depth P of the incision.

The tread in accordance with embodiments of the invention is such that each wide incision portion has a volume situated for the most part between half the depth P of the cut-out and the depth P: this means that the volume of each wide incision portion situated between 50% of the depth P and the depth P is greater than the volume of the same wide portion situated between the rolling surface when new and 50% of the depth P of this incision.

Furthermore, to reduce the losses linked to the hysteresis of the materials constituting the tread and generated by the deformation of these materials on coming into contact with the road when rolling, the sum (sum LE) of the widths LE of the narrow portions of all the transverse incisions of the upstanding elements of the same circumferential row satisfies the following condition:

$$0.90 \times E/R < (\text{sum } LE)/Pr < 1.10 \times E/R, \text{ in which:}$$

(sum LE) is the sum of the mean widths LE of the narrow portions of all the incisions separating the upstanding elements of the same row on a circle centred on the rotation axis of the tire, R is the mean radius of the circle centred on the rotation axis on the rolling surface of the row concerned when new and Pr is the mean perimeter of that same circle, E is the mean thickness of the tread at the level of the row concerned.

Complying with this condition ensures closing of the narrow portions of the incisions on coming into contact, this closing being linked only to a modification of the curvature of the tread and not to deformation of the materials. This therefore limits as much as possible transverse deformation and deformation in compression in the direction of the thickness of the tread. This limitation of the deformation in contact with the road results in a significant reduction of the losses linked to the hysteresis of the materials and to their deformation.

Of course, the tread in accordance with embodiments of the invention may further comprise a plurality of cut-outs that can be grooves or incisions or a combination of grooves and incisions.

In a preferred embodiment, each wide incision portion comprises a first part of constant width (this part having a width at least equal to 2 mm) between the rolling surface of the tread when new and a depth at least equal to half the depth P of the incision, this first part being extended by a second part having a width greater than the width of the first part. The depth of passage between the first part and the second part is preferably at least equal to 50% of the depth P of the incision and preferably at most equal to 75% of that same depth.

In accordance with a variant of this embodiment, the narrow parts of the incision may be provided with locally widened parts in order to reduce the stresses in the material at the bottom of the incision, as in the prior art.

In accordance with another preferred embodiment, each wide incision part has a width that increases regularly from the rolling surface to the depth P of the incision.

In accordance with another preferred embodiment, each wide incision part is of constant or quasi-constant width but its length measured in a direction parallel to the direction of the edges formed by the incision on the rolling surface increases with depth.

It is possible to provide an abrupt transition between each wide part and each narrow part. However, it is preferable for the wide part to include a connecting region adapted to connect it progressively to the narrow portion.

The mean width LL of each wide incision part greater than the mean width of each narrow part of the same incision is preferably at least equal to 1.5 mm and more preferably greater than 2 mm so as to remain open when in contact with the road surface.

The lengths of the narrow and wide parts measured in the direction of the length of the incision may be adapted as required: they may be equal or the narrow parts may be longer than the wide parts. These lengths may notably be determined so that the open area on the rolling surface of each of the narrow and wide parts is substantially identical. By open area is meant the cavity area on the rolling surface when new. The length of an incision corresponds to the distance between the end points of the edges of said incision on the rolling surface when new.

The greatest volume of each wide portion—the volume measured between half the depth and the bottom of the incision—is advantageously at least equal to 1.10 times the volume of said wide portion measured between the rolling surface and half the depth.

The greatest volume is more advantageously at least equal to 1.20 times the smallest volume of the same wide portion.

In accordance with a variant of the tread in accordance with the invention, each wide incision part has a constant width LL and a length DL increasing with depth, this length DL being measured in the direction of the incision on the rolling surface. The direction of an incision on the rolling surface corresponds to the direction of a straight line segment joining the end points of that incision on that surface.

In accordance with a variant of the invention, each wide incision part has a width increasing regularly between the rolling surface when new and the bottom of the incision.

In accordance with another variant of the invention, each wide incision part has a constant width between the rolling surface when new and a depth P1 greater than half the depth P of the incision, this part of constant width being extended to the depth P by a part having a width greater than the width of the part having a constant width.

The invention of course, in certain embodiments, concerns tires provided with treads in accordance with the invention as just described and more particularly tires for touring vehicles.

Other features and advantages of the invention emerge from the description given hereinafter with reference to the appended drawings which show embodiments of the subject matter of the invention by way of nonlimiting example.

BRIEF DESCRIPTION OF THE FIGURES

The invention will be better understood thanks to the description of the drawings, in which:

FIG. 1 shows a tread comprising two rows of elements each provided with incisions in accordance with the invention;

FIG. 3 represents diagrammatically an incision in accordance with a second variant of the invention;

DETAILED DESCRIPTION OF SPECIFIC EMBODIMENTS

Figure 2:
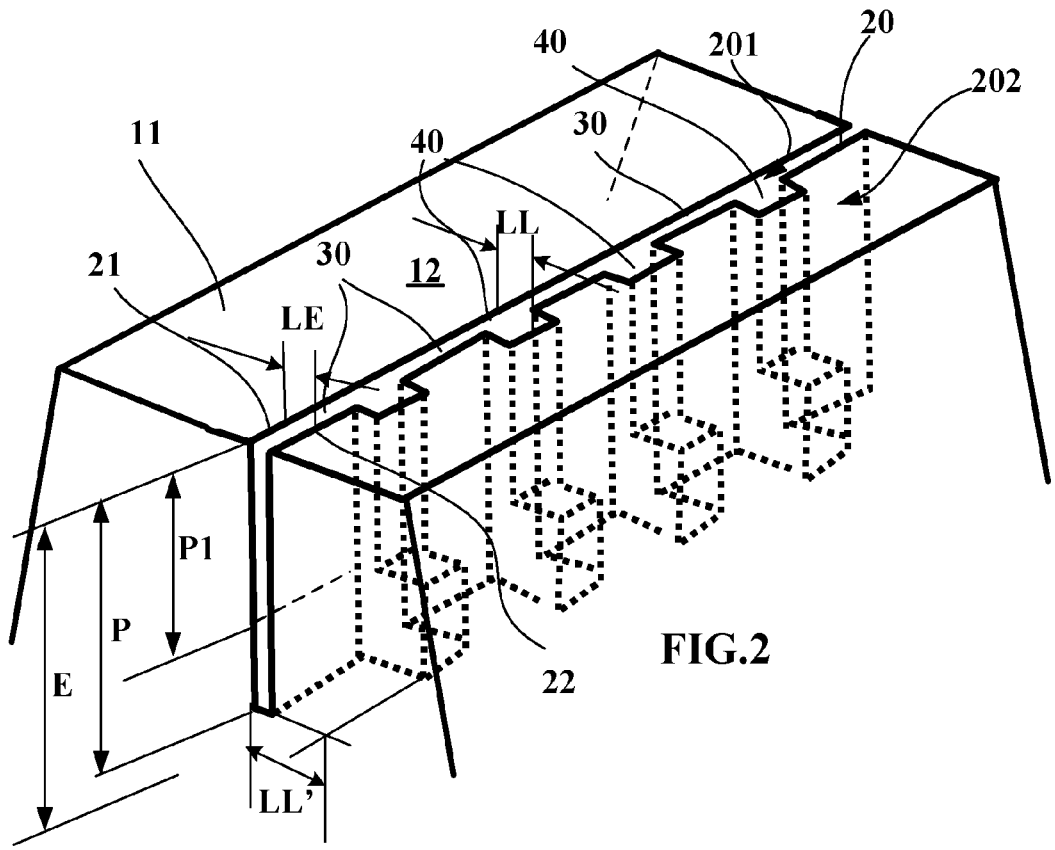
FIG. 2 represents diagrammatically an incision in accordance with a first variant of the invention.

To facilitate the reading of the figures, the same reference signs may be employed for the description of variants of the invention provided that these reference signs refer to elements of the same structural or functional kind.

FIG. 1 shows a tire embodiment comprising two circumferential rows 1 of upstanding elements 2, these rows 1 being separated from one another by a circumferential groove 3. These rows 1 form circumferential ribs provided with a plurality of incisions 20 in accordance with the invention; these incisions 20 have a substantially transverse orientation, i.e. they are inclined at a mean angle equal to 15° to the direction of the rotation axis of the tire. These incisions 20 delimit with the circumferential grooves a plurality of upstanding elements 11. Each incision 20 comprises alternating narrow parts 30 having a width LE and wide parts 40 having a width greater than the width LE. Each incision 20 is inclined at a mean angle A equal to 15 degrees to the transverse direction (indicated by the direction YY' in FIG. 4).

Each substantially transversely oriented incision (20) leads onto the rolling surface (12) and has a depth P at most equal to the thickness E of the tread measured at the level of the row concerned. Each incision (20) forms on the rolling surface of the tire when new two facing edges (21, 22), these edges (21, 22) delimiting at least one narrow portion (30) of the incision, i.e. a portion having a mean width LE less than or equal to 2 mm, and at least one wide portion (40) of the incision, i.e. a portion having a mean width LL greater than 2 mm. These wide and narrow portions are disposed alternately, a narrow portion being followed by a wide portion. Each narrow portion (30) extends the full depth P of the incision (20) and has a volume uniformly distributed over the entire depth P of the incision. Each wide portion (40) extends the full depth P of the incision (20) and has a volume that is not uniformly distributed and is for the most part between half the depth P of the cut-out and the depth P.

To limit deformation of the upstanding elements 11 on coming into contact with a road when rolling, the number and width of the incisions 20 of each row 1 are determined as a function of the perimeter Pr of a circle centred on the rotation axis of the tire and tangential to the external surface of each rib (the trace of this circle is indicated by a straight line segment D). This perimeter is preferably measured over the median part of each row 1 and on the rolling surface of the tire when new (i.e. before any rolling and wear).

In the present case—corresponding to a 205/55R16 tire— the sum of the widths LE of the narrow parts of the cut-outs of the same rib satisfy the following condition:

$$0.90 \times E/R < (\text{sum } LE)/Pr < 1.10 \times E/R, \text{ in which:}$$

R is the mean radius of the circle centred on the rotation axis on the rolling surface of the row concerned when new—in the present case R=316 mm;

Pr is equal to the perimeter of this same circle—in the present case Pr=1985 mm;

E is the mean thickness of the tread at the level of the row concerned—in the present case E=10 mm;

(sum LE) is the sum of the mean widths LE of the narrow parts of all the incisions separating the upstanding elements of the same row on a circle centred on the rotation axis of the tire—in the present case, LE=0.6 mm and (sum LE)=60 mm.

Each row comprises one hundred incisions disposed with a pitch equal to 8 mm.

FIG. 2 shows one variant of an incision in accordance with the invention. FIG. 2 shows only part of the rolling surface, namely the part on the upstanding element 11. This upstanding element 11 comprises a cut-out or incision 20 in accordance with the invention, this incision leading onto the rolling surface 12 and having a depth P slightly less than the thickness E of the tread. By "cut-out" is meant a hollow space of a tread delimited by walls of rubber mixture or any other material forming the tread and leading onto the rolling surface, where it forms two facing edges. In the present case, the incision 20 is delimited by a first wall 201 and a second wall 202; the first wall 201 is plane while the second wall 202 is formed of a plurality of plane parts 221, 222, some of these plane parts 221 being parallel to the first wall 201 of the incision 20 and the other parts 222 being perpendicular to the first wall 201.

The incision 20 shown forms two facing edges 21 and 22 on the rolling surface 12 of the tire when new. The edge 21 has a rectilinear trace—defining the length of the incision 20—while the other edge 22 has a trace formed of rectilinear edge sections, some of the sections being parallel to the edge 21 and others perpendicular to that same edge 21. LE is the smallest mean distance separating the sections of the edge 22 parallel to the edge 21.

These edges 21, 22 delimit in the case shown five narrow parts 30 of the incision 20, i.e. parts having a mean width LE less than or equal to 2 mm, and four wide parts 40 of the incision 20, i.e. parts having a mean width LL greater than 2 mm, these wide and narrow portions being disposed alternately, each narrow portion 30 and each wide portion 40 extending the full depth P of the cut-out 20.

Moreover, it is seen that between the rolling surface when new and a depth P1 less than P the narrow portions 30 and wide portions 40 do not change geometry, whereas from this depth P1 and as far as the depth P the wide parts 40 have a width LL' that is greater than the width LL of the wide parts between the rolling surface when new and the depth P1. Here the width LL' is approximately 30% greater than the width LL.

In the present case, the depth P1 represents substantially two thirds of the depth P.

In this manner, each wide part 40 has a volume for the most part between half the depth P of the cut-out and the depth P. In other words more than 50% of the available volume of each wide part is located between the depth P1 and the depth P of the cut-out.

Example of values for a 205/55R16 tire:
Thickness E=10 mm
Depth of cut-out P=8 mm
Depth P1=5 mm
Width of narrow part LE=0.6 mm
Width of wide part LL (between rolling surface and depth P1)=2 mm
Width of wide part LL' (between depth P1 and total depth P)=3 mm In a second variant of the invention, shown in FIG. 3, the geometry of the wide parts 40 of the incisions 20 is modified. In fact, each wide part 40 retains the same width LL over the entire depth P of the incision 20 but each wide part has a width measured parallel to the rectilinear edge 21 (i.e. parallel to the length of the incision 20) that varies as a function of depth and in the present case increases regularly with depth in order for the volume of each wide part to be for the most part situated between half the depth P of the incision 20 and the depth P. By altering the geometry of the wide parts it is easy to have a greater or lesser part of the volume of each wide part between 50% of the depth P and said depth P. To limit stress concentrations the bottom of the incision may be provided over its entire length with an additional part in the form of a circular section channel as in the prior art. This volume of the additional part is not taken into account to evaluate the volume of the wide part of the incision.

Figure 4:
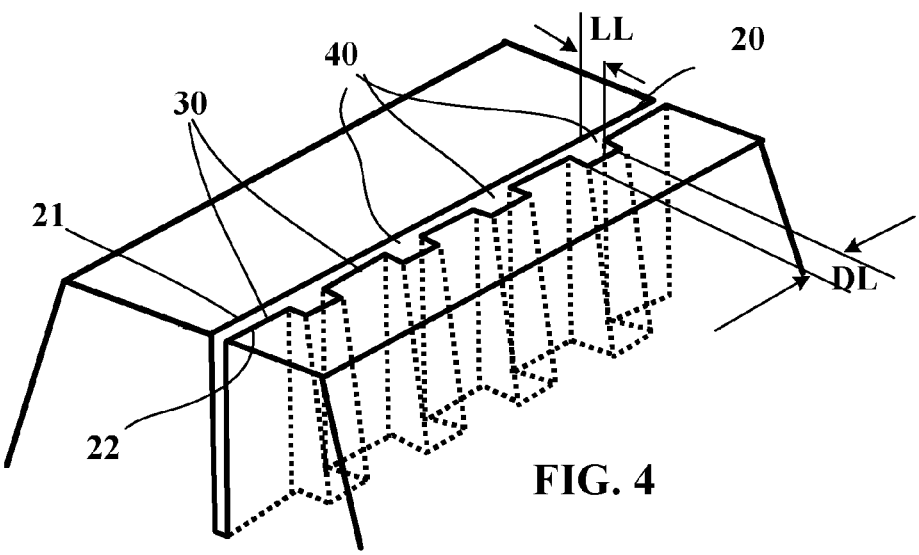
FIG. 4 represents diagrammatically an incision in accordance with a third variant of the invention.

In a third variant of the invention, shown in FIG. 4, the geometry of each wide part 40 of a cut-out 20 is modified relative to that of each wide part of the incisions shown in FIGS. 2 and 3. Here, each wide part 40 retains the same length DL measured parallel to the rectilinear edge 21 and has a width LL measured perpendicularly to the rectilinear edge 21. This width LL varies regularly, increasing with depth in order for the volume of each wide part to be for the most part situated between half the depth P of the cut-out 20 and the depth P.

Figure 5:
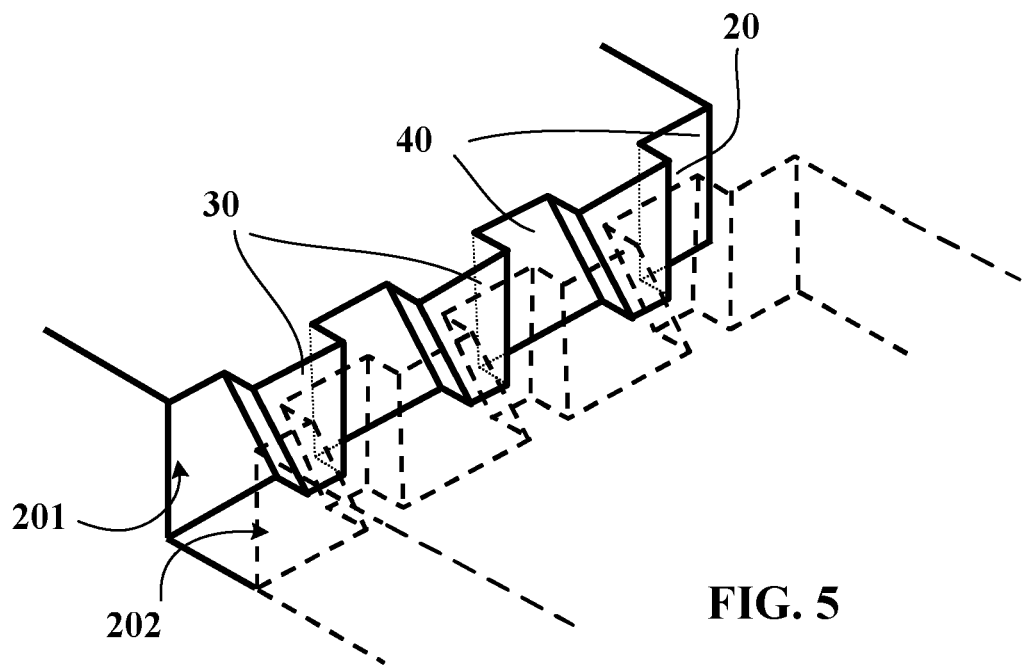
FIG. 5 represents diagrammatically an incision in accordance with a fourth variant of the invention.

FIG. 5 shows an incision 20 in accordance with a fourth variant of the invention, this variant reproducing on each wall 201, 202 delimiting an incision 20 the non-plane geometry of a wall of the incision shown in FIG. 2. In this fourth variant, the incision 20 is formed of a plurality of wide parts 40 and narrow parts 30 and the volume of the wide parts is for the most part situated between 50% and 100% of the total depth of the incision. Another variant (not shown here) could in the same manner as the first variant employ the geometry of the non-plane wall of the incision shown in FIG. 2 or the non-plane wall of the incision shown in FIG. 4.

Figure 6:
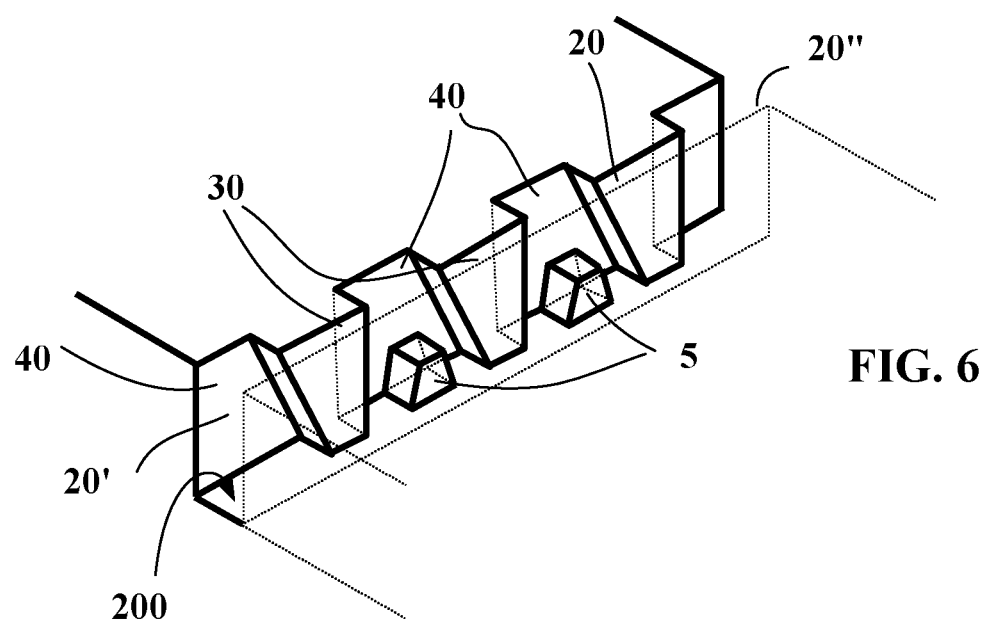
FIG. 6 represents diagrammatically an incision in accordance with a fifth variant of the invention.

FIG. 6 represents an incision 20 in accordance with a fifth variant of the invention that is relatively close to the incision shown in FIG. 3 and in which studs 5 are provided at the bottom of the incision 200 in some of the wide parts 40 to protect said bottom. As shown in this variant, the incision 20 comprises at its two ends 20', 20" wide parts 40 leading into grooves and it may not be necessary to provide these wide parts with studs on the groove bottom at the ends; as shown in this figure, any foreign body introduced into one or the other of these wide parts can migrate toward a lateral groove and consequently not remain in place. Of course, the reduction of volume consequent upon the presence of these studs 5 must be compensated in order to satisfy the necessary condition that the volume of the wide parts is for the most part under 50% of the depth P of the incision 20.

The examples described refer to incisions in which the lengths of each narrow part and each wide part are substantially equal; of course, it is within the competence of the person skilled in the art to adapt the dimensions of the narrow and wide parts according to what is required, notably in terms of performance.

Similarly, the variants shown and described in the present document may be combined in the same tire as a function of the intended objective.

Finally, the invention is not limited to the examples described and shown to which various modifications may be made without departing from the scope defined by the claims.

The invention claimed is:

1. A tire comprising a tread, comprising:
a rolling surface intended to come into contact with the ground,
at least one circumferential row of upstanding elements, these upstanding elements being separated from one another in the circumferential direction by incisions of transverse orientation,
each incision of transverse orientation leading onto the rolling surface and having a depth P at most equal to a value E of the tread, each incision forming on the rolling surface of the tire, when new, two facing edges, these edges delimiting at least one narrow portion of the incisions having a mean width LE less than or equal to 2 mm, and at least one wide portion of the incisions having a mean width LL greater than 2 mm, these wide and narrow portions being disposed alternately, each narrow portion and each wide portion extending the full depth P of the incision, each narrow portion having a volume uniformly distributed over the full depth P of the incision, each wide portion having a volume between half the depth P of the cut-out and the depth P, wherein the following condition is satisfied:

$$0.90 \times (E/R) < (\text{sum} LE)/Pr < 1.10 \times (E/R), \text{ wherein:}$$

(sum LE) is the sum of the mean widths LE of the narrow portions of all the incisions separating the upstanding elements of the same row on a circle centered on the rotation axis of the tire, R is the mean radius of the circle centered on the rotation axis on the rolling surface of the row concerned when new and Pr is the mean perimeter of the circle centered on the rotation axis and tangential to the upstanding elements, E is the mean thickness of the tread at the level of the row concerned.

2. The tire according to claim 1, wherein a greatest volume of each wide portion (the volume measured between half the depth and the bottom of the incision) is at least equal to 1.10 times the volume of said wide portion situated between the rolling surface and half the depth of the incision.

3. The tire according to claim 2, wherein the greatest volume of each wide portion is at least equal to 1.20 times the smallest volume of the same wide portion.

4. The tire according to claim 1, wherein each wide part of an incision has a constant width LL and a length DL increasing with depth, this length DL being measured in the direction of the incision on the rolling surface, this direction corresponding to the direction of a straight line segment joining the end points of this incision on this surface.

5. The tire according to claim 1, wherein each wide part of an incision has a width increasing regularly between the rolling surface when new and the bottom of the incision.

6. The tire according to claim 1, wherein each wide part of an incision has a constant width between the rolling surface when new and a depth P1 greater than half the depth P of the incision, this part of constant width being extended to the depth P by a part having a width greater than the width of the part of constant width.

7. The tire according to claim 1, wherein at least some wide portions are provided with studs at the bottom of the incision.

* * * * *